(12) United States Patent
Grieco

(10) Patent No.: US 7,773,562 B2
(45) Date of Patent: *Aug. 10, 2010

(54) SOFT AND SOFTER HANDOVER IN TIME DIVISION DUPLEX CODE DIVISION MULTIPLE ACCESS (TDD-CDMA) NETWORKS

(75) Inventor: Donald M. Grieco, Manhassett, NY (US)

(73) Assignee: InterDigital Technology Corporation, Wilmington, DE (US)

(*) Notice: Subject to any disclaimer, the term of this patent is extended or adjusted under 35 U.S.C. 154(b) by 1217 days.

This patent is subject to a terminal disclaimer.

(21) Appl. No.: 11/220,155

(22) Filed: Sep. 6, 2005

(65) Prior Publication Data

US 2006/0007896 A1 Jan. 12, 2006

Related U.S. Application Data

(63) Continuation of application No. 10/749,458, filed on Dec. 31, 2003, now Pat. No. 6,944,142.

(60) Provisional application No. 60/469,990, filed on May 13, 2003.

(51) Int. Cl.
*H04W 4/00* (2009.01)
(52) U.S. Cl. .................................. 370/331; 455/442
(58) Field of Classification Search ............... None
See application file for complete search history.

(56) References Cited

U.S. PATENT DOCUMENTS

| | | | |
|---|---|---|---|
| 5,978,365 A | 11/1999 | Yi | |
| 6,418,320 B2 | 7/2002 | Yoshida et al. | |
| 6,473,467 B1 * | 10/2002 | Wallace et al. | 375/267 |
| 6,618,428 B2 | 9/2003 | Jechoux et al. | |
| 6,633,554 B1 | 10/2003 | Dalal | |
| 6,678,523 B1 | 1/2004 | Ghosh et al. | |
| 6,711,124 B2 * | 3/2004 | Khayrallah et al. | 370/208 |
| 6,765,952 B2 * | 7/2004 | Shiu | 375/147 |
| 6,768,727 B1 * | 7/2004 | Sourour et al. | 370/335 |
| 6,775,260 B1 * | 8/2004 | Dabak et al. | 370/342 |
| 6,775,329 B2 * | 8/2004 | Alamouti et al. | 375/267 |
| 6,856,608 B1 | 2/2005 | Furukawa et al. | |
| 6,931,050 B1 * | 8/2005 | Bottomley | 375/130 |

(Continued)

FOREIGN PATENT DOCUMENTS

EP 0 964 529 12/1999

(Continued)

*Primary Examiner*—Phirin Sam
(74) *Attorney, Agent, or Firm*—Volpe and Koenig, P.C.

(57) ABSTRACT

A wireless communication system, method and apparatus are provided for soft and softer handover of a mobile wireless transmit/receive unit (WTRU) between two or more base stations and/or base station sectors. A network control unit assigns selected base stations to transmit communication data to the WTRU based on the WTRU being disposed in base station or base station sector geographic range of service. A joint detector (JD) receiver is configured to receive and process one or more wireless data signals in each of a series of timeframes where each signal received within a common timeslot has a unique channel encoding of the same communication data. The JD receiver has a plurality of channel estimators that estimate received signals within a common timeslot and a combiner configured to decode and combine the channel estimates to derive a resultant data signal.

3 Claims, 6 Drawing Sheets

U.S. PATENT DOCUMENTS

| | | | |
|---|---|---|---|
| 6,944,142 B2 * | 9/2005 | Grieco | 370/331 |
| 7,039,024 B2 * | 5/2006 | Nefedov | 370/314 |
| 7,133,435 B2 * | 11/2006 | Papasakellariou et al. | 375/148 |
| 7,200,124 B2 * | 4/2007 | Kim et al. | 370/324 |
| 7,295,597 B2 * | 11/2007 | Fitton et al. | 375/148 |
| 7,324,584 B1 * | 1/2008 | Vigneron et al. | 375/150 |
| 7,372,825 B1 * | 5/2008 | Schmidl et al. | 370/328 |
| 7,450,671 B2 * | 11/2008 | Pajukoski et al. | 375/347 |
| 2002/0006122 A1 | 1/2002 | Zeira | |
| 2002/0094834 A1 | 7/2002 | Baker et al. | |
| 2002/0101908 A1 * | 8/2002 | Kim et al. | 375/147 |
| 2003/0058823 A1 * | 3/2003 | Nishimura | 370/335 |
| 2003/0072277 A1 * | 4/2003 | Subrahmanya et al. | 370/320 |
| 2003/0171118 A1 | 9/2003 | Miya | |
| 2003/0185165 A1 | 10/2003 | Ishii et al. | |
| 2004/0008646 A1 | 1/2004 | Park et al. | |
| 2004/0116143 A1 | 6/2004 | Love et al. | |
| 2004/0125863 A1 * | 7/2004 | Ghosh | 375/147 |
| 2004/0160925 A1 | 8/2004 | Heo et al. | |
| 2004/0166884 A1 | 8/2004 | Oh et al. | |
| 2008/0069270 A1 * | 3/2008 | Tyra et al. | 375/317 |
| 2008/0170638 A1 * | 7/2008 | Schmidl et al. | 375/295 |

FOREIGN PATENT DOCUMENTS

| | | |
|---|---|---|
| JP | 2001-217773 | 8/2001 |
| JP | 2001-359138 | 12/2001 |
| RU | 2278480 | 7/2005 |
| RU | 2265959 | 12/2005 |
| WO | 99/14885 | 3/1999 |
| WO | 99/30519 | 6/1999 |

* cited by examiner

SOFT AND SOFTER HANDOVER IN TIME DIVISION DUPLEX CODE DIVISION MULTIPLE ACCESS (TDD-CDMA) NETWORKS

CROSS REFERENCE TO RELATED APPLICATION

This application claims priority from U.S. Non-Provisional application Ser. No. 10/749,458 filed Dec. 31, 2003 and U.S. Provisional Application No. 60/469,990 filed May 13, 2003, which is incorporated by reference as if fully set forth herein.

FIELD OF INVENTION

The invention generally relates to handover in wireless communication systems. In particular, the invention relates to soft and softer handover in TDD-CDMA networks.

BACKGROUND

The terms base station, wireless transmit/receive unit (WTRU) and mobile unit are used in their general sense. As used herein, a wireless transmit/receive unit (WTRU) includes, but is not limited to, a user equipment, mobile terminal, mobile station fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units. When referred to hereafter, a base station is a WTRU that includes, but is not limited to, a base station, Node B, site controller, access point, or other interfacing device in a wireless environment.

In a third generation partnership program (3GPP) or 3GPP-like system, time division duplex (TDD) wireless communications are encoded with scrambling codes, spreading codes and predetermined training sequences known as midambles, which are helpful to reconstruct the originally transmitted signals. Each base station cell uses a unique scrambling code to distinguish base stations in the network when establishing a link between a particular base station and the WTRUs that it serves. Spreading codes are associated with spreading each WTRU's data into pieces across the same frequency bandwidth as the other WTRUs, while tagging each respective data signal with a unique spreading code to permit reconstructing the data at the receiver. The midamble is a designated portion of a time division channel timeslot containing a known code sequence that is used at the receiver during channel estimation.

In many wireless communication systems, many communications may share the same radio frequency spectrum. When receiving a specific communication, all the other communications using the same spectrum cause interference to the specific communication. As a result, increasing the transmission power level of one communication degrades the signal quality of all other communications within that spectrum. However, reducing the transmission power level too far results in undesirable received signal quality, such as measured by signal to interference ratios (SIRs) at the receivers. In such systems, transmission power control algorithms are used.

Various methods of open and closed loop power control for wireless communication systems are known in the art. The purpose of such systems is to rapidly vary transmitter power in the presence of a fading propagation channel and time-varying interference to minimize transmitter power while insuring that data is received at the remote end with acceptable quality. One approach is to divide transmission power control into separate processes, referred to as outer loop power control (OLPC) and inner loop power control (ILPC).

In outer loop power control, the power level of a specific transmitter is based on a target SIR value. As a receiver receives the transmissions, the quality of the received signal is measured. The transmitted information is sent in units of transport blocks (TBs), and the received signal quality can be monitored on a block error rate (BLER) basis. The BLER is estimated by the receiver, typically by a cyclic redundancy check (CRC) of the data. This estimated BLER is compared to a target quality requirement, such a target BLER, representative of quality of service (QoS) requirements for the various types of data services on the channel. Based on the measured received signal quality, a target SIR adjustment control signal is sent to the transmitter. The transmitter adjusts the target SIR in response to these adjustment requests.

In 3GPP wideband code division multiple access (W-CDMA) systems utilizing time division duplex (TDD) mode, the network sets the initial target SIR to the WTRU at the call/session establishment and then subsequently continuously adjusts the target SIR of the WTRU during the life term of the call as dictated by the observation of the uplink (UL) BLER measurement.

In inner loop power control, the receiver compares a measurement of the received signal quality, such as SIR, to a threshold value (i.e., the target SIR). If the SIR exceeds the threshold, a transmit power command (TPC) to decrease the power level is sent. If the SIR is below the threshold, a TPC to increase the power level is sent. Typically, the TPC is multiplexed with data in a dedicated channel to the transmitter. In response to received TPC, the transmitter changes its transmission power level.

FIG. 1 shows a block diagram of a portion of a wireless network configuration, including base stations BS1 and BS2, and WTRU1, WTRU2 and WTRU3. The base stations are the link between the communication network and the WTRU. The network (not shown) is responsible for routing information to its correct destination, overseeing multiple base stations, managing radio resources within the geographic area of wireless radio service coverage serviced by the base stations and controlling the physical radio resources for the interface between the base station and WTRU. Base station BS1 transmits in region 11, base station BS2 transmits in region 12, and region 13 represents an overlapping region between the two base stations, in which WTRU1 resides. In this example, WTRU1 is mobile and moving from region 11 to region 12. As such, WTRU1 is a candidate for handover, while WTRU3 in region 11 and WTRU2 in region 12 are positioned to communicate adequately with their respective affiliated base stations BS1 and BS2.

FIG. 2 shows a block diagram of a portion of a wireless network operating under softer handover. In softer handover, two or more sectors of a single base station transmit and receive a WTRU's signal. Here, base station BS transmits and receives according to sector 21 and 22. While WTRU2 resides in sector 22, and WTRU3 resides in sector 21, they have no need for handover as their positions allow for efficient communication with each of their respective base station sectors. However, WTRU1 resides in overlapping region 23, which falls within both sector 21 and sector 22. Therefore, WTRU1 is a candidate for softer handover as it travels between sectors 21 and 22.

The need to manage and control handover of WTRUs is of paramount importance in telecommunication networks. It is known that soft handover (SHO) is used in FDD-CDMA networks, including IS-95, CDMA 2000 and 3GPP WCDMA. Soft handover can improve performance when the WTRU is located where comparable power is received from two or more base stations (BSs).

Currently, only hard handover is supported in the standardized 3GPP TDD WCDMA systems, for both high and low chip-rate variants. In hard handover, transmission and reception of signals between WTRU1 and base stations BS1 and BS2 do not occur as smoothly as in soft handover, or between sectors 21 and 22 as in softer handover. In hard handover, the communication transition to the second base station or sector can only commence if the first communication is terminated with WTRU1. Providing a method to implement soft handover in TDD CDMA networks would yield increased capacity and coverage.

SUMMARY

An apparatus, a system and a method are presented for wireless communication in a network system having a plurality of base stations where a WTRU receives communication data that is selectively encoded and transmitted in predefined time frames. The WTRU has a joint detector receiver which receives and processes multiple downlink wireless signals, each signal received within a common timeslot having a unique channel encoding of the same communication data from the plurality of base stations. A plurality of channel estimators produce a channel estimate of a respective received signal within a common timeslot based on the unique encoding of the received signal. A combiner receives channel estimates from all of the channel estimators and combines data estimates for each data signal received in a common timeslot into a combined data signal whereby the communication data common to the plurality of signals received in the common timeslot is then derived from the combined signal.

The base station to which the mobile WTRU in soft handover is newly assigned has a joint detection receiver including a plurality of channel estimators configured to process individual uplink signals from each WTRU within the newly assigned base station's geographic area or cell. Midamble codes are processed by the channel estimators to produce channel estimates of the uplink signals. The base station receiver also includes a data estimator which processes the channel estimates with a plurality of scrambling codes and spreading codes associated with the WTRUs in uplink communication with the base station. The data estimator is configured to process both its own assigned scrambling code $S_{new}$ used by all WTRUs assigned to the base station and the scrambling code $S_{old}$ associated with the WTRU in soft handover, which is associated with the WTRU's originally assigned base station that is also participating in the soft handover. Finally, a decoder is used to decode the convolutional or turbo coding of data estimator output signals to produce reconstructed data signals transmitted in the uplink communications.

BRIEF DESCRIPTION OF THE DRAWING(S)

DETAILED DESCRIPTION OF THE PREFERRED EMBODIMENT(S)

Although the embodiments are described in conjunction with a third generation partnership program (3GPP) wideband code division multiple access (W-CDMA) system utilizing the time division duplex (TDD) mode, the embodiments are applicable to any time slotted or hybrid code division multiple access (CDMA)/time division multiple access (TDMA) communication system, including TD-SCDMA.

Figure 1:
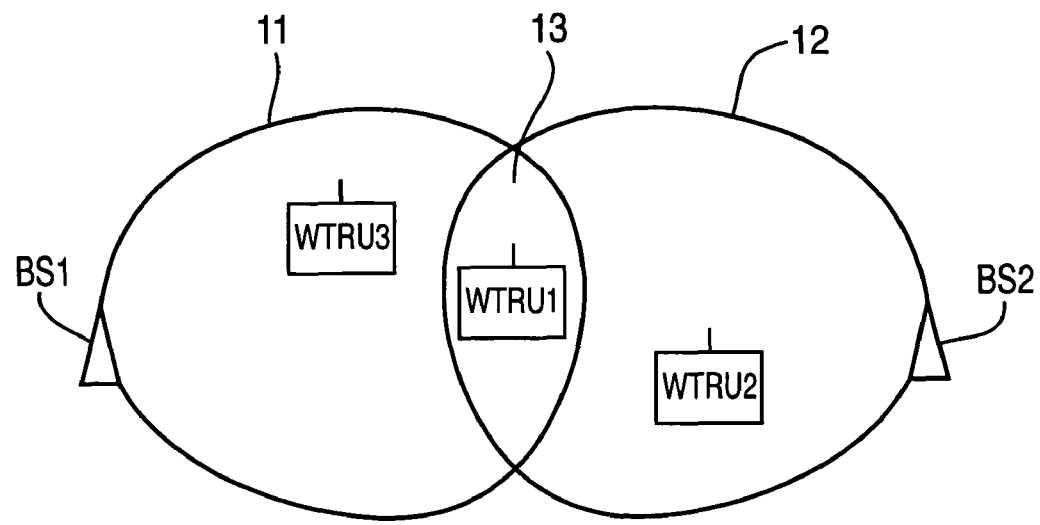
FIG. 1 shows a block diagram of a communication network comprising two base station regions and at least one WTRU in an overlapping region.
Figure 3:
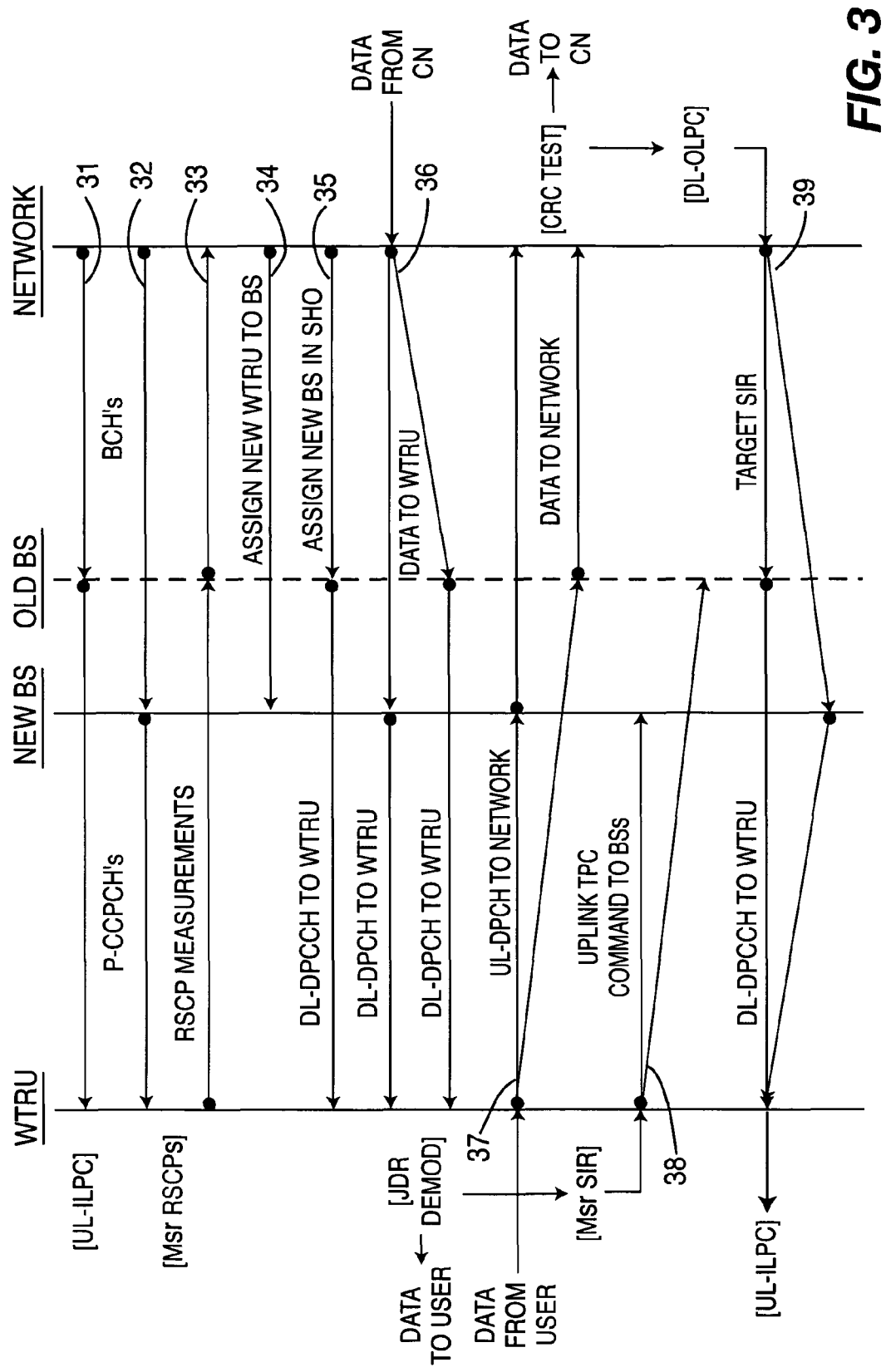
FIG. 3 shows a diagram of network communication message exchanges for soft handover.

FIG. 3 shows a diagram of sequenced messaging of a TDD-CDMA network engaged in soft handover. The involved entities in soft handover are the network, a WTRU, a first (old) base station and a second (new) base station. In reference to the configuration shown in FIG. 1, WTRU1 is the representative WTRU, base station BS1 is the old base station with which WTRU1 originally established communication, and BS2 is the new base station toward which mobile WTRU1 is moving. Both WTRU1 and base stations BS1, BS2 use receivers that combine signals received over multiple paths.

The exchange begins at lines 31 and 32, where network signals on broadcast channels (BCHs) for base stations BS1 and BS2 are received by WTRU1 as beacon signals preferably configured as primary common control physical channels (P-CCPCHs). This exchange is within the context of uplink inner loop power control (UL-ILPC). Next at line 33, WTRU1 measures the received signal code power (RSCP) from the beacon signals and sends the RSCP measurements to the network via the old base station BS1. For simplicity, this example is explained in the context of two base stations. However, WTRU1 is continually monitoring signal strengths of beacon signals transmitted by all neighboring base stations and measuring their respective RSCPs. These measurements are reported to the network. Based on the reported measurements, the network recognizes the new base station BS2 as a candidate for soft handover (SHO) of WTRU1, and decides to employ SHO for WTRU1 accordingly. New base station BS2 receives notification of a new assignment to WTRU1 for SHO (line 34). The network informs the BS2 of the scrambling and spreading codes of WTRU1 now entering SHO. WTRU1 is notified via BS1 that BS2 has been assigned for SHO (line 35), including the scrambling and spreading codes to be used by the new base station BS2, preferably sent on a down link dedicated physical control channel (DL-DPCCH). At this point, a simultaneous communication link between WTRU1 and both base stations BS1 and BS2 is established for SHO.

Downlink communication data is exchanged from the network to WTRU1 via both base stations BS1 and BS2, preferably on the downlink dedicated physical channel (DL-DPCH) as shown at lines 36. Both downlink data communication transmissions from BS1 and BS2 are synchronized to occur at a predetermined frame number and in a common timeslot. The data on this parallel downlink communication is identical and transmitted by both base stations BS1 and BS2.

A joint detection (JD) receiver at WTRU1 performs a different channel estimate for each base station BS1 and BS2, utilizing the known scrambling codes. In an alternative embodiment, the WTRU1 can include blind code detection to limit the spreading codes for other WTRUs to only those comparable to or stronger than its own codes when programming the codes for the JD receiver, which results in improved performance.

Uplink communication data from WTRU1, preferably on an uplink dedicated physical channel (UL-DPCH), is received by both SHO base stations BS1 and BS2, which demodulate the signal and send the results to the network (line 37). Upon receipt, the network performs a cyclic redundancy check (CRC) test on the received data. A set of receiver data not having a CRC-detected error is kept and passed on to the core network.

Closed-loop outer loop power control is used for the downlink for both chip-rate variants of 3GPP TDD-WCDMA. The WTRU measures the received SIR for the combined output of the JD receiver. It then transmits an up/down transmit power control (TPC) command to base stations BS1 and BS2 (line 38). The base stations decode this TPC command and adjust their transmit powers accordingly.

Open-loop inner loop power control is used in the uplink for 3GPP TDD WCDMA using the high chip rate variant. The WTRU measures the received power from each base station's beacon channel, reads each base station's interference power reported periodically, and transmits with a power sufficient to achieve a signaled target SIR at each base station in SHO. To do this, WTRU1 cycles through each base station, periodically measuring beacon power and reading data. The network ensures that there is no conflict between receiving broadcast data from each base station BS1 and BS2 in SHO and WTRU1's dedicated traffic time slots. Preferably, this is achieved by arranging all broadcast time slots to be coincident. WTRU1 transmits with the lowest power necessary to achieve the target SIR at BS1 and BS2. As shown at line 39, the network adjusts the target SIRs for each base station in an attempt to ensure that at least one will receive an error-free message. WTRU1 receives the target SIRs preferably on the DL-DPCCH.

Figure 2:
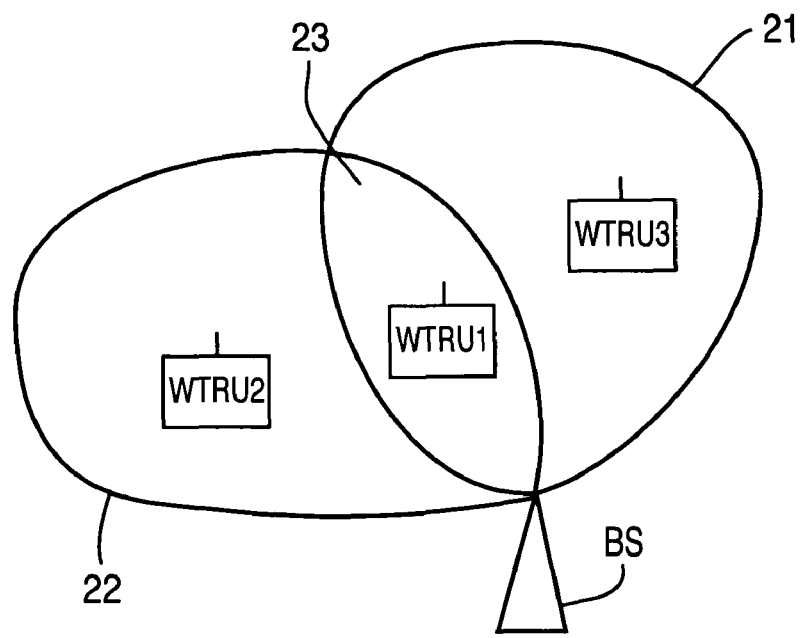
FIG. 2 shows a block diagram of a communication network comprising a base station with two sectors and at least one WTRU in an overlapping region of the sectors.
Figure 4:
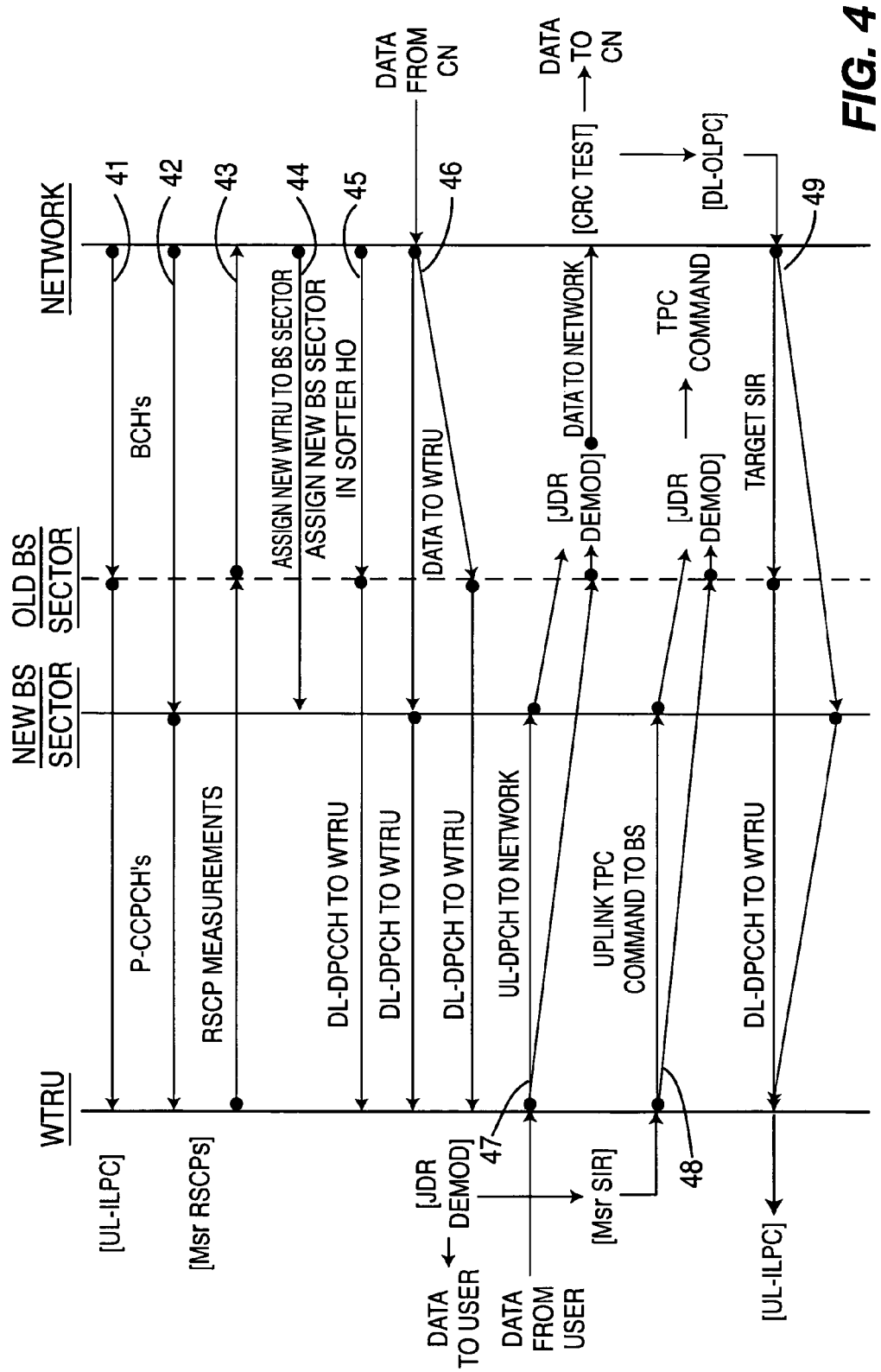
FIG. 4 shows a diagram of network communication message exchanges for softer handover.

FIG. 4 shows diagram of sequenced messaging of a TDD-CDMA network engaged in softer handover, which is similar to soft handover as explained in reference to FIG. 3. The involved entities in softer handover are the network, a WTRU, a first (old) base station sector and a second (new) base station. In reference to the configuration shown in FIG. 2, WTRU1 is the representative WTRU, sector 21 is the old base station sector with which WTRU1 originally established communication, and sector 22 is the new base station sector toward which mobile WTRU1 is moving.

The exchange begins at lines 41 and 42, where network signals on BCHs for old and new base station sectors 21 and 22 are received by WTRU1 as beacon signals configured as P-CCPCHs. This exchange is within the context of UL-ILPC. Next at line 43, WTRU1 measures the RSCP from the beacon signals and sends the RSCP measurements to the network via the old base station sector 21. For simplicity, this example is explained in the context of two base station sectors. However, a base station may have more than two sectors, in which case WTRU1 continually monitors signal strengths of beacon signals transmitted by all neighboring base station sectors and measures their respective RSCPs. These measurements are reported to the network. Based on the reported measurements, the network recognizes the new base station sector 22 as a candidate for softer HO of WTRU1, and decides to employ softer HO for WTRU1 accordingly. New base station sector 22 receives notification of a new assignment to WTRU1 for softer HO (line 44). The network informs the new base station sector 22 of the scrambling and spreading codes of WTRU1 now entering softer HO. WTRU1 is notified via old base station sector 21 that new base station sector 22 has been assigned for softer HO (line 45), including the scrambling and spreading codes to be used by the new base station sector 22, preferably sent on a DL-DPCCH. At this point, a simultaneous communication link between WTRU1 and both base sectors 21 and 22 is established for softer HO.

Downlink communication data is exchanged from the network to WTRU1 via both base station sectors 21 and 22, preferably on the DL-DPCH as shown at lines 46. Both downlink data communication transmissions from base station sectors 21 and 22 are synchronized to occur at a predetermined frame number. The data on this parallel downlink communication is identical but transmitted by both base station sectors with distinct scrambling codes particular to the respective base station sector. A JD receiver at WTRU1 performs a different channel estimate for each base station sector 21 and 22, utilizing the known scrambling codes. The WTRU may also use blind code detection to limit the codes for other WTRUs to only those comparable to or stronger than its own codes when programming the codes for the JD receiver, which results in improved performance.

Uplink communication data from WTRU1, preferably on a UL-DPCH, is received by a JD receiver at base stations BS, which demodulates and soft-combines the parallel data for sectors 21 and 22 and sends the results to the network (line 47). Upon receipt, the network performs a CRC test on the received data. A set of receiver data not having a CRC-detected error is kept and passed on to the core network. Note that for softer HO, only one set of data is received from WTRU1 due to the data combination performed at base station BS.

With respect to closed-loop power control used for the softer HO downlink, WTRU1 measures the received SIR for the combined output of its JD receiver. It then transmits a TPC command to base station BS (line 48), and received at each base station sector 21 and 22. The base station JD receiver soft-combines and decodes these parallel TPC commands them to produce the resultant TPC command for the network.

With respect to open-loop inner loop power control used in softer HO, the WTRU measures the received power from each base station sector's beacon channel, reads each base station sector's interference power reported periodically, and transmits with a power sufficient to achieve a signaled target SIR at each base station sector in HO. To do this, WTRU1 cycles through each base station sector, periodically measuring beacon power and reading data. The network ensures that there is no conflict between receiving broadcast data from each base station sector 21 and 22 in softer HO and WTRU1's dedicated traffic time slots. Preferably, this is achieved by arranging all broadcast time slots to be coincident. WTRU1 transmits with the lowest power necessary to achieve the target SIR at sectors 21 and 22. As shown at line 49, the network adjusts the target SIR for the base station BS, which is the same for both sectors 21 and 22. WTRU1 receives the target SIR preferably on the DL-DPCCH from each base station sector 21 and 22.

It should be understood that although FIGS. 3 and 4 are described for soft and softer handover as separate processes, a base station according to the present invention is capable of simultaneously performing both soft and softer handover for one or more WTRUs.

Figure 5:
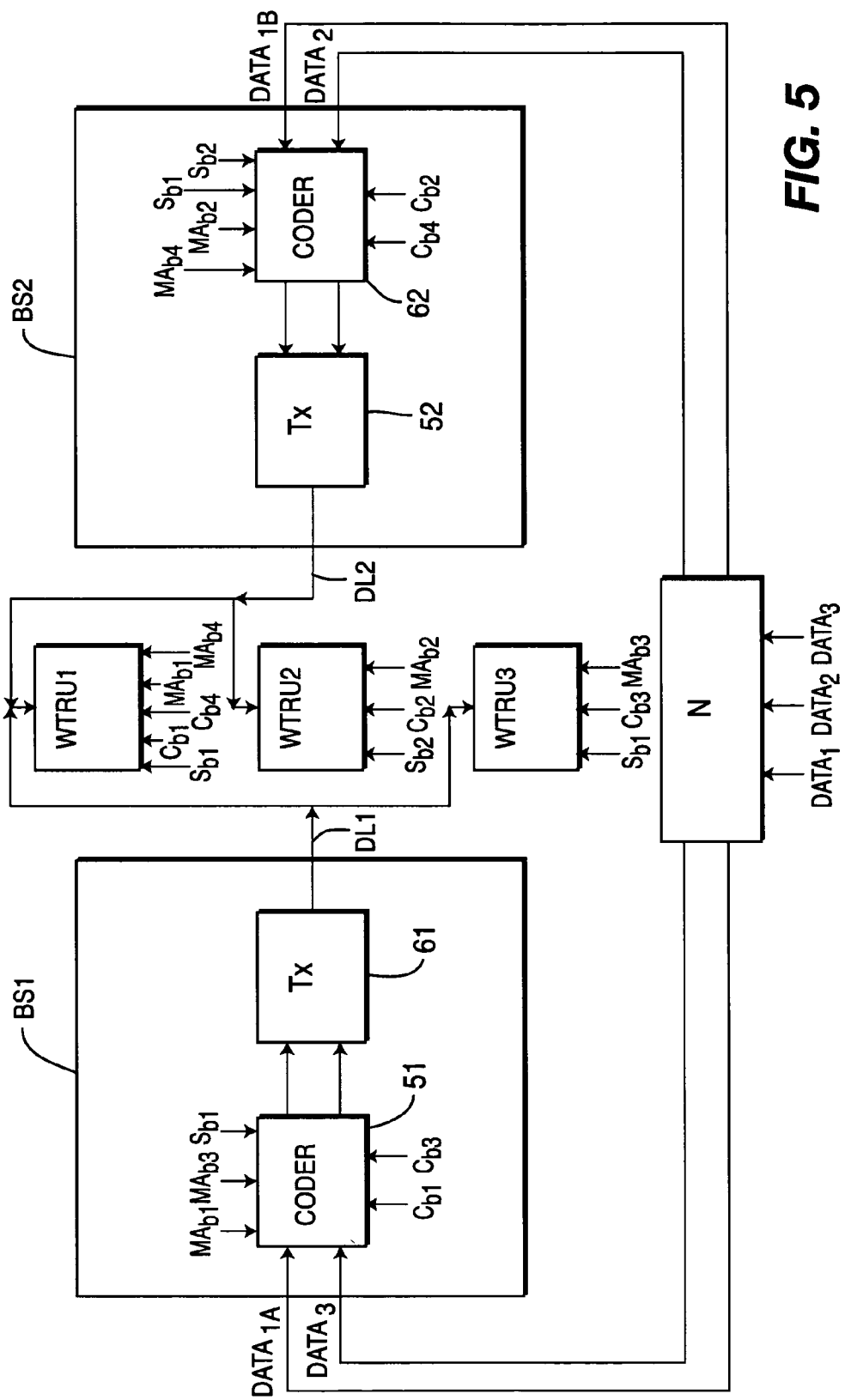
FIG. 5 shows a block diagram of a communication network engaged in downlink communications with one WTRU in soft handover.

FIG. 5 shows a block diagram of a network configuration during SHO, comprising network controller N, base stations BS1 and BS2, and mobile units WTRU1, WTRU2 and WTRU3. Base station BS1 comprises an encoder 51 and transmitter 61. Base station BS2 comprises an encoder 62 and transmitter 61. Each base station BS1 and BS2 uses a scrambling code Sbi, and spreading code Cbi, and a midamble code MAbi assigned by the network. The network assigns WTRU1, WTRU2, and WTRU3 to base stations BS1 and BS2 according to geographic range of service of the selected base station. Although multiple spreading codes are typically used, only one code is described here for simplicity. Each WTRU uses a scrambling code Sbi, a spreading code Cbi and a midamble code MAbi to match those used by each respective base station servicing the cell.

WTRU2, serviced by base station BS2, uses primary scrambling code $Su_2$, the scrambling code used by BS2, spreading code $Cb_2$ and midamble $MAb_2$, uniquely assigned to WTRU2. WTRU3, which is serviced by base station BS1, uses primary scrambling code $Sb_1$, the scrambling code of base station BS1, spreading code $Cb_3$ and midamble $MAb_3$, which are uniquely assigned to WTRU3.

Now consider WTRU1 which is in SHO with both base station BS1 and BS2. WTRU1 uses scrambling code $Sb_1$, since it was originally serviced by BS1, and spreading code $Cb_1$ and midamble $MAb_1$, uniquely assigned to WTRU1. In order to communicate with base station BS2, WTRU1 also uses $Sb_1$, but with different spreading and midamble codes $Cb_4$ and $MAb_4$.

Through network controller N, the network sends data $DATA_1$ for WTRU1 and $DATA_3$ for WTRU3 to base station BS1, where it is processed with spreading codes $Cb_1$ and $Cb_3$, scrambling code $Sb_1$, and midambles $MAb_1$ and $MAb_3$, respectively, at encoder 51. A combined signal is mapped to the wireless channel and transmitted at transmitter 61.

Simultaneously, the network controller N sends replica data for WTRU1 to base station BS2, along with data for WTRU2. At encoder 62, scrambling code $Sb_1$, spreading code $Cb_4$ and midamble $MAb_4$ are applied to the data signal intended for WTRU1, while codes $Sb_2$, $Cb_2$ and midamble $MAb_2$ are applied to the data signal intended for WTRU2. Each WTRU1, WTRU2 and WTRU3 receives the downlink data signals and processes the signals with demodulation and decoding to reconstruct the data signals $DATA_1$, $DATA_2$ and $DATA_3$ sent by the network controller N. The common downlink data received by WTRU1 is shown as DL1 from base station BS1 and DL2 from base station BS2.

Figure 6:
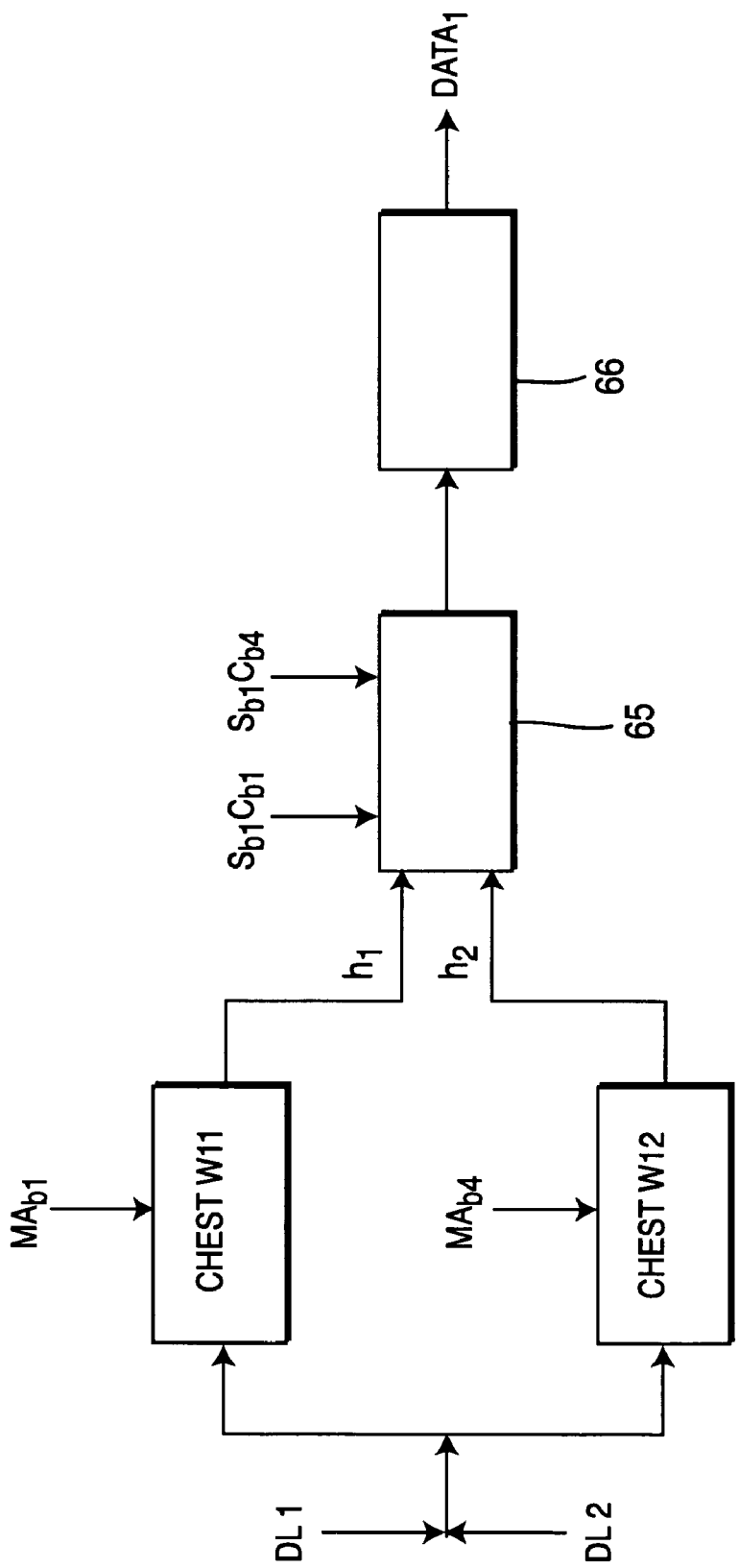
FIG. 6 shows a block diagram of a WTRU joint detection receiver processing a soft handover.

FIG. 6 depicts a block diagram of a joint detection (JD) receiver for downlink signal processing at WTRU1 in SHO. WTRU1's JD receiver is configured to receive and process multiple wireless signals in each of a series of timeframes. Each signal is received within a common time frame and timeslot. As described in reference to FIG. 5, unique channel encoding of the same communication data distinguishes the source of the signal as either from BS1 or BS2 during SHO, and either base station sector 21 or 22 during softer HO. The JD receiver comprises channel estimators CHEST W11 and CHEST W12, a data estimator 65 and a decoder 66. Two channel estimators CHEST W11 and CHEST W12 receive downlink signals DL1 and DL2 from base stations BS1 and BS2, respectively. Using midamble $MAb_1$ for estimating the channel from base station BS1, and midamble $MAb_4$ for base station BS2, CHEST W11 and CHEST W12 provide two channel estimates, $h_1$ and $h_2$ respectively, to data estimator 65.

The data estimator 65 jointly detects the data sent from base station BS1 using Sb1 and $Cb_1$, and base station BS2 using $Sb_1$ and $Cb_4$. The joint detection is simplified by the use of the same scrambling code $Sb_1$. Data estimator 65 soft combines the data, which is next sent to the decoder 66, where any error coding, such as convolutional or turbo code, is decoded. The final output at decoder 66 is data signal $DATA_1$ as originated in the core network CN.

Figure 7:
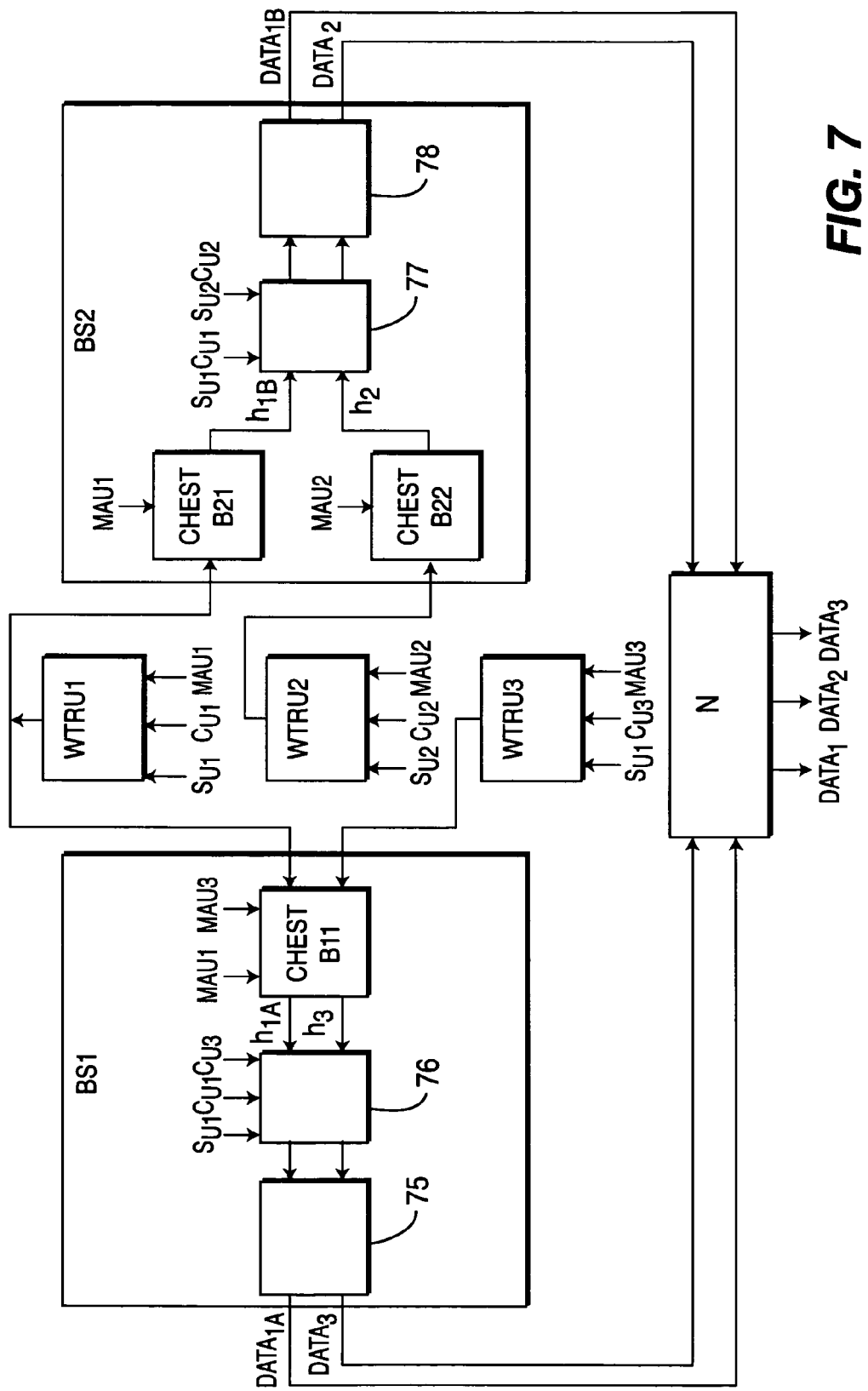
FIG. 7 shows a block diagram of a communication network engaged in uplink communications with one WTRU in soft handover.

FIG. 7 depicts the uplink processing in SHO by the same network configuration shown in FIG. 5. Mobile units WTRU1, WTRU2 and WTRU3 use scrambling codes $Su_1$, $Su_2$ and $Su_1$, respectively. This assignment is reflective of the WTRU's original base station affiliation (i.e., WTRU1 has original base station assignment to BS1 and uses scrambling code $Su_1$ accordingly). Mobile units WTRU1, WTRU2, WTRU3 use spreading codes $Cu_1$, $Cu_2$, and $Cu_3$, and midambles $MAu_1$, $MAu_2$ and $MAu_3$ respectively. It should be noted that for any new WTRU entering a base station cell, as in the case of WTRU1, the chance exists that the spreading code for that WTRU may be the same as that of a WTRU currently within the base station cell. Normally, the same spreading code may not be used by two WTRUs in the same base station cell. However, in SHO the WTRUs can be distinguished by different scrambling codes. Referring to FIG. 7, the scrambling codes $Su_1$ and $Su_2$ are unique for WTRU1 and WTRU2, respectively, to allow base station BS2 distinguish them in the event that spreading codes $Cu_1$ and $Cu_2$ were the same. Likewise, a common spreading code is not normally allowed for two different WTRUs transmitting to a single base station sector. However, during softer HO, the base station can distinguish two WTRUs using the same spreading code because each WTRU has a different scrambling code.

The receiver of base station BS1 uses a single CHEST B11 loaded with $MA_1$ and $MA_3$, producing channel estimate $h_{1A}$, for the path between WTRU1 and BS1, and $h_3$ for the path between WTRU3 and BS1. The other base station BS2 has a joint detection receiver including two channel estimators CHEST B21 and CHEST B22—one for WTRU2 not in SHO, the other for WTRU1 in SHO. CHEST B21 is used to account for the scrambling code $S_1$ used by WTRU1. CHEST B21 also accommodates any possible timing difference between the arrival times of the signals from the WTRUs in SHO and those not in SHO, the latter having their timing advances controlled by base station BS2. Channel estimator CHEST B21 processes midamble $MA_1$ producing channel estimate $h_{1B}$ while channel estimator CHEST B22 processes midamble $MA_2$ producing channel estimate $h_2$.

Data estimator 76 of base station BS1 descrambles scrambling code S1 and despreads codes C1 and C3, where decoder 75 further processes the signals by decoding any error coding, such as convolutional or turbo coding. The output of decoder 75 is the reconstructed data signals $DATA_{1A}$ and $DATA_3$ from WTRU1 and WTRU3, respectively. Similarly, data estimator 77 and decoder 78 reconstruct the data signals $DATA_{1B}$ and $DATA_2$ from WTRU1 and WTRU2. Where data estimator 77 would normally expect to process a single scrambling code associated with base station BS2 in which it resides (i.e., $Su_2$), it is given the capability to process scrambling code $Su_1$ in addition to $Su_2$, to permit soft handover of WTRU1. The network controller N receives the data signals from base stations BS1 and BS2. For WTRU1 in SHO, when at least one set of data (i.e., $DATA_{1A}$ or $DATA_{1B}$) is received without a CRC error, network controller N passes the error-free data set as data signal $DATA_1$ to the core network.

What is claimed is:

1. A base station configured for wireless communication on an uplink channel and a downlink channel jointly with a first wireless transmit/receive unit (WTRU) and a second WTRU, wherein the uplink channel and the downlink channel each carry data communications containing a midamble code sequence (MAi), a spreading code (Ci), and a scrambling code (Si) that are uniquely assigned to the base station, the first WTRU, and the second WTRU to distinguish from neighboring WTRUs and base stations, the base station comprising:

a first channel estimator configured to produce a first channel estimate of the uplink channel from the first WTRU responsive to a first midamble ($MA_1$);

a second channel estimator configured to produce a second channel estimate of the uplink channel from the second WTRU responsive to a second midamble ($MA_2$);

a data estimator configured to:

jointly detect data received from the first WTRU and the second WTRU, the data estimator using a first spreading code and a first scrambling code with respect to the first WTRU and using a second spreading code and a second scrambling code with respect to the second WTRU; and output a soft combined data signal; and a decoder configured to decode convolutional coding or turbo coding of the soft combined data signal to produce a reconstructed data signal transmitted by the first WTRU and the second WTRU.

2. The base station of claim 1, wherein the communication signals are of a time-division duplex-code division multiple access (TDD-CDMA) type.

3. The base station of claim 1, wherein the first spreading code and the second spreading code are the same and the first WTRU and the second WTRU are distinguished by the first scrambling code and the second scrambling code.

\* \* \* \* \*